United States Patent
Dong et al.

(10) Patent No.: US 10,996,968 B2
(45) Date of Patent: May 4, 2021

(54) SUPPORT FOR APPLICATION TRANSPARENT, HIGH AVAILABLE GPU COMPUTING WITH VM CHECKPOINTING

(71) Applicant: INTEL CORPORATION, Santa Clara, CA (US)

(72) Inventors: Yaozu Dong, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 15/529,426

(22) PCT Filed: Nov. 24, 2014

(86) PCT No.: PCT/CN2014/092028
§ 371 (c)(1),
(2) Date: May 24, 2017

(87) PCT Pub. No.: WO2016/082073
PCT Pub. Date: Jun. 2, 2016

(65) Prior Publication Data
US 2017/0329623 A1    Nov. 16, 2017

(51) Int. Cl.
*G06T 15/00* (2011.01)
*G06F 9/455* (2018.01)
(Continued)

(52) U.S. Cl.
CPC .......... *G06F 9/45558* (2013.01); *G06T 1/20* (2013.01); *G06T 1/60* (2013.01); *G06F 2009/45579* (2013.01); *G06F 2009/45583* (2013.01)

(58) Field of Classification Search
CPC ......... G06T 15/005; G06T 1/20; G06T 15/04; G09G 5/363; G06F 9/3851
(Continued)

(56) References Cited

U.S. PATENT DOCUMENTS 9,201,887 B1 * 12/2015 Earl .................. G06F 17/30088
2008/0155169 A1 * 6/2008 Hiltgen ............... G06F 9/45558
711/6

(Continued)

FOREIGN PATENT DOCUMENTS

WO    2016/082073 A1    6/2016

OTHER PUBLICATIONS

Extended European Search report received for European Patent Application No. 14906872.8, dated Jun. 13, 2018, 10 pages.
(Continued)

*Primary Examiner* — Gordon G Liu
(74) *Attorney, Agent, or Firm* — Compass IP Law PC

(57) ABSTRACT

Methods, software, and apparatus for application transparent, high available GPU computing with VM checkpointing. The guest access of certain GPU resources, such as MMIO resources, are trapped to keep a copy of guest context per semantics, and/or emulate the guest access of the resources prior to submission to the GPU, while other commands relating to certain graphics memory address regions are trapped before being passed through to the GPU. The trapped commands are scanned before submission to predict: a) potential to-be-dirtied graphics memory pages, and b) the execution time of intercepted commands, so the next checkpointing can be aligned to a predicted execution time. The GPU internal states are drained by flushing internal context/tlb/cache, at the completion of submitted commands, and then a snapshot of the vGPU state is taken, based on tracked GPU state, GPU context (through GPU-specific commands), detected dirty graphics memory pages and predicted to-be dirtied graphics memory pages.

25 Claims, 13 Drawing Sheets

(51) Int. Cl.
*G06T 1/20* (2006.01)
*G06T 1/60* (2006.01)

(58) Field of Classification Search
USPC .......................................... 345/522
See application file for complete search history.

(56) References Cited

U.S. PATENT DOCUMENTS

2011/0134111 A1* 6/2011 Stone .................. G06F 9/45541
 345/419
2013/0185716 A1* 7/2013 Yin ..................... G06F 9/45558
 718/1

OTHER PUBLICATIONS

Communication pursuant to Rules 161(2) and 162 EPC received in European Patent Application No. 14906872.8, dated Jun. 30, 2017, 2 pages.
International Preliminary Report on Patentability received for PCT Patent Application No. PCT/CN2014/092028, dated Jun. 8, 2017, 6 pages.
International Search Report and Written Opinion received for PCT Patent Application No. PCT/CN2014/092028, dated Sep. 2, 2015, 12 pages.
Tian et al., "A Full GPU Virtualization Solution with Mediated Pass-Through", Intel Corporation, 2014 USENIX Annual Technical Conference, USENIX Association, 2014, pp. 121-132.

* cited by examiner

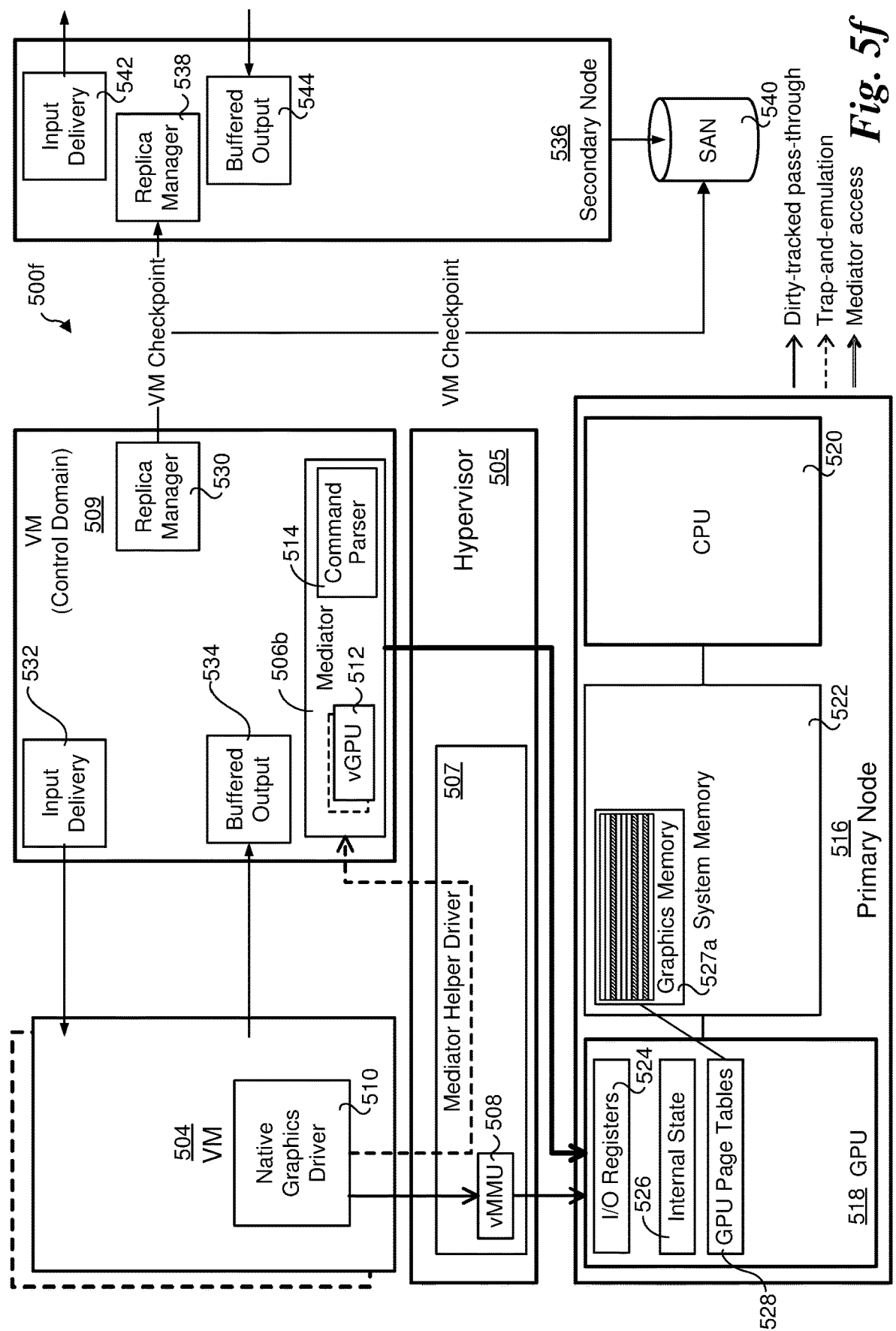

SUPPORT FOR APPLICATION TRANSPARENT, HIGH AVAILABLE GPU COMPUTING WITH VM CHECKPOINTING

This application is a U.S. national phase of International Patent Application No. PCT/CN2014/092028 filed Nov. 24, 2014 is hereby incorporated herein by reference in its entirety and for all purposes.

BACKGROUND INFORMATION

Graphic Processing Units (GPUs) are specialized electronic components originally designed for performing very high-speed operations pertaining to generating graphic images on computer displays. For example, modern computers include either a GPU on a motherboard or employ a graphics cards including a GPU (or in some cases multiple GPUs). Moreover, some GPUs are so complex and powerful that graphics cards designed for gaming applications may exceed both the cost and power consumption of the host computers they are used in. GPUs are also used to generate graphics for other types of devices, such as smartphones, and support such features as animation, hardware-based zooming, texture mapping, and screen rotation.

While modern GPUs are very efficient at manipulating computer graphics, their highly parallel structure makes them more effective than general-purpose CPUs for performing algorithms that process large blocks of data in parallel. Thus, in addition to use for GPU rendering, the use of GPUs in general purpose computing on GPU (GPGPU) computing is becoming more and more popular in many areas, such as the high-performance computing (HPC), image processing, packet filtering, weather broadcast, web technology and computer aided design (CAD). Some of these usages require fault-tolerance and high availability capability, such as for the real-time image processing and packet filtering.

Virtualization is commonly used in cloud-based environments, such as data centers. Under virtualization, compute resources in the data center can be used more efficiently and more flexibly. While software architectures to support virtualization of most computing resources (CPU, memory, storage I/O, network I/O, etc.), such as hypervisors or virtual machine managers (VMMs) is mature, virtualization of GPU resources presents additional challenges that are not well-addressed by existing hypervisors and VMMs, especially when talking about some complex virtualization features, such as VM replication.

Virtualization provides a means for addressing fault-tolerance and high availability requirements, which are traditionally implemented with hardware redundancy and/or software complexity. VM replication allows application-agnostic fail-over at the time of hardware failures, by replicating the state of a Primary VM (PVM) running on a primary node, to a Secondary VM (SVM) running on a secondary node.

Lock-stepping replicates VM state at the instruction level, i.e. PVM/SVM runs in parallel for deterministic instructions, while lock-step is used for non-deterministic instructions, with input events replicated into both VMs. However lock-stepping faces a big challenge for MP (multi-processor) guest situations, where memory accesses may be non-deterministic, thus lock-stepping becomes a performance bottleneck.

Checkpointing generates PVM snapshots to SVM periodically, with all output packets buffered until a successful checkpoint is completed in current epoch, such as Xen Remus (See, e.g., Cully, B., Lefebvre, G., Meyer, D., Feeley, M., Hutchinson, N., Warfield, A.: Remus: high availability via asynchronous virtual machine replication. In: Proceedings of the 5th USENIX Symposium on Networked Systems Design and Implementation, NSDI 2008, pp. 161-174. USENIX Association, Berkeley (2008)). Such a design allows failover to the last snapshot against hardware failures, overcoming the issue of non-deterministic memory access in MP-guests. VM checkpointing works well for MP guest cases. However, the checkpointing solution works for software abstracted devices only, such as paravirtualized devices. Existing techniques in VM checkpointing can't be used to checkpoint dedicated pass-through devices (the device exclusively owned by one VM) and/or shared pass-through devices (the device shared by multiple VMs), where all or some of the resources are passed through to hardware directly without VMM intervention, and thus the device state is difficult to snapshot.

Fault-tolerance and high availability requirements are even more challenging for GPUs. Currently, there are no solutions that address these challenges.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is block schematic diagram illustrating the forwarding programming of GPU commands from a CPU to a ring buffer and batch buffers, and subsequent fetch of the commands by the GPU of FIG. 1a;

FIG. 5f is a block schematic diagram illustrating an architecture using a hybrid Type-1 hypervisor configured to implement aspects of the embodiments disclosed herein under which system memory is used for graphics memory;

FIG. 7b is a rear isometric view of the blade server chassis of FIG. 8a;

DETAILED DESCRIPTION

Figure 1A:
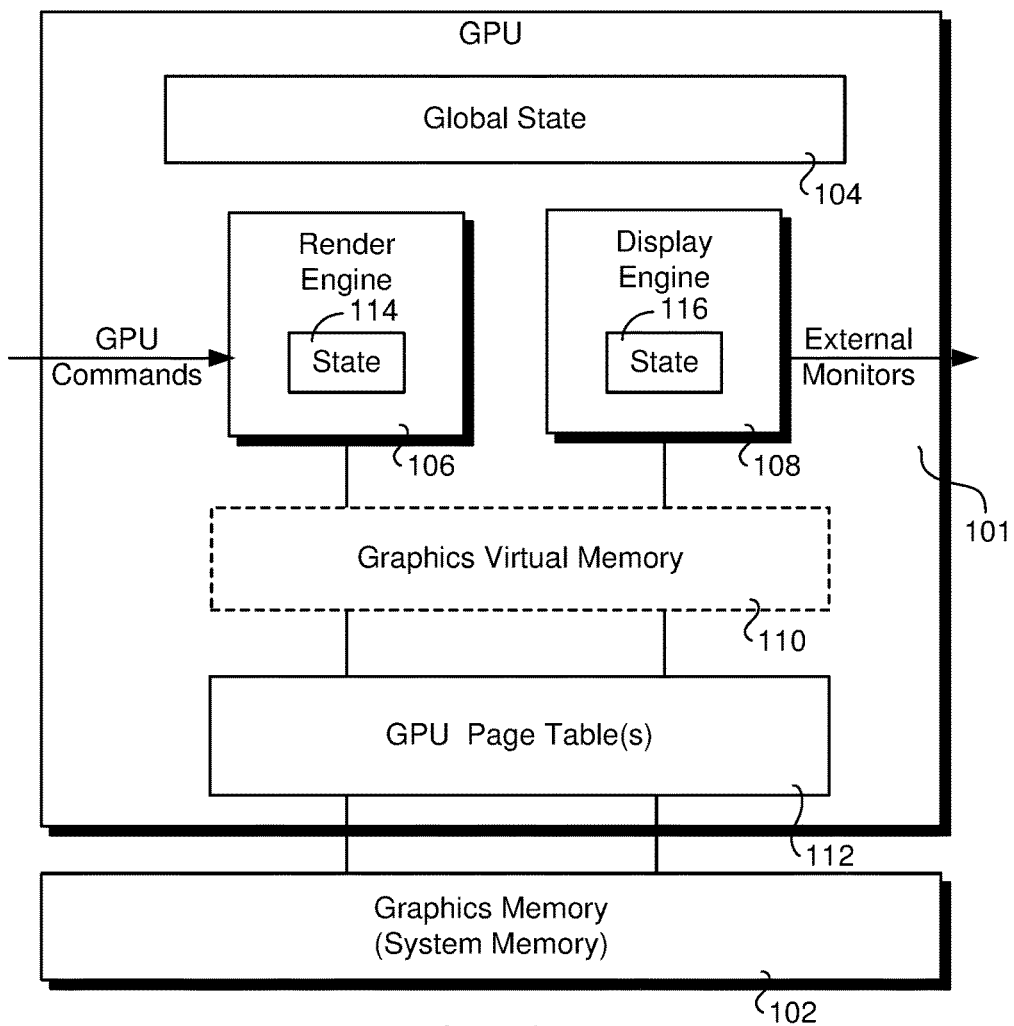
FIG. 1a is a block schematic diagram of a GPU that accesses system memory, according to one embodiment.

Embodiments of methods, software, and apparatus for application transparent, high available GPU computing with VM checkpointing are described herein. In the following description, numerous specific details are set forth to provide a thorough understanding of embodiments disclosed and illustrated herein. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Addressing GPU fault-tolerance and high availability requirements presents unique considerations that are not present with CPUs. A GPU architecture is very comprehensive, and is impossible to fully emulate a GPU using a software-only implementation. So it imposes a challenge on how to capture GPU state when generating VM replication for fault-tolerance, while still providing good performance. To better appreciate this, the following provides a brief description of an exemplary GPU architecture and its operation.

Figure 1B:
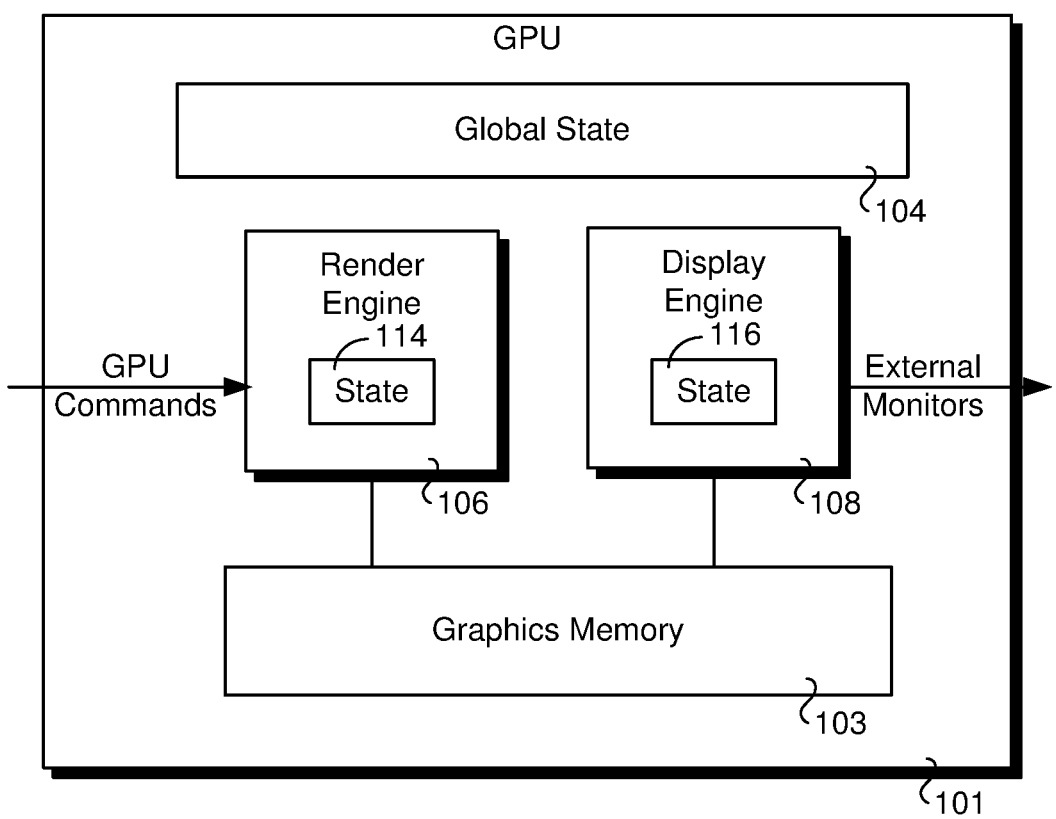
FIG. 1b is a block schematic diagram of a GPU that includes on-die memory, according to one embodiment.

FIG. 1a depicts an exemplary GPU 100 coupled to external graphics memory 102. In one embodiment system memory is used for graphics memory 102, while on a graphics card or the like graphics memory will comprise memory that is on-board the graphics card. Under some architectures (such as shown in FIG. 1b), GPUs use local on-die memory. In addition, a combination of local and system memory may be used.

GPU 100 includes a global state block 104, a render engine 106, a display engine 108, graphics virtual memory 110 and GPU page table(s) 112. Render engine 106 is used for hardware acceleration of graphics rendering operation and is configured to render graphics content onto one or more virtual canvases in memory and perform associated mathematical operations (such as affine transformations, manipulation of texture maps, image manipulation, etc.) via multiple processes that are run in parallel. Its internal architecture may include fixed pipelines and a set of programmable execution units (both not shown), with corresponding state registers 114. Display engine 108 is used for routing data from graphics memory 102 to external monitors and other types of display devices, and includes state registers 116. In this example, there is no on-die graphics memory. GPU 100 may comprise one or many GPU page tables 112, to map system memory into virtual address spaces (as known as graphics virtual memory). In one embodiment, this is used to implement graphics virtual memory 110, when there is no on-die memory in the GPU. In some embodiments, a unified virtual address space is possible to map either on-die graphics memory or system memory. This memory is the graphics virtual memory actually used by the render engine and the display engine. Not all the virtual address spaces may be accessible globally. Some address spaces may be only local to one engine. Global state block 104 represents the remaining circuitry and logic, including circuitry used for initialization, power management, etc.

FIG. 1b depicts an exemplary GPU 101 that includes local on-die graphics memory 103. As with GPU 100, GPU 101 includes a global state 104, a render engine 106 with state registers 114, and a display engine 108 with display state registers 103. In addition, GPU 101 may include other components that are now shown for simplicity.

The complete GPU state consists of the render engine state, the display engine state, the global state, GPU page table(s) and the graphics memory content, which can be dumped out through accessing I/O registers (MMIO registers, PCI configuration space registers, Port I/O registers), issuing a GPU command to dump internal hardware context into graphics memory, and accessing the graphics memory pages. When graphics virtual memory is implemented, GPU page tables are also part of GPU state. GPU page table may reside in I/O registers or in system memory. Here to simplify the description, we assume the GPU page table(s) is/are in I/O registers. A complete GPU state is huge, especially when graphics virtual memory address spaces are considered (for example, recent GPUs support a 64-bit address space). Also, in some embodiments not all the graphics memory is directly visible to the CPU, so to dump the whole graphics memory, extra GPU commands are required to copy from the CPU-invisible area to the CPU-visible area with additional copy costs. As a result, it is impractical to make a complete dump of the GPU state, for periodical VM checkpointing (usually in 10's millisecond level). This is the first major challenge why existing techniques for VM replication can't work with GPU pass-through configurations.

Figure 2:
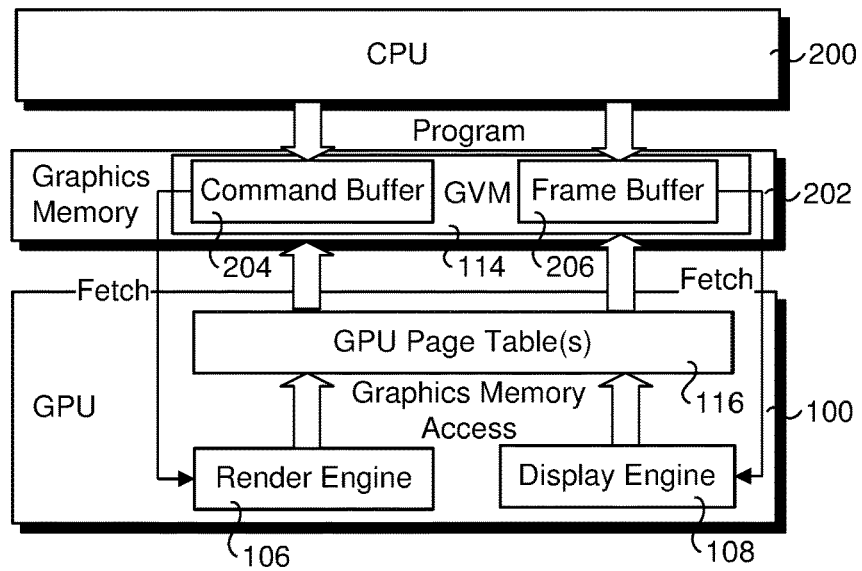
FIG. 2 is a block schematic diagram illustrating fetching of commands and frame buffer content by a GPU that accesses system memory.

FIG. 2 shows an exemplary system architecture including a CPU 200, graphics memory 202, and a GPU 100. As shown, graphics memory 202 includes a command buffer 204 and a frame buffer 206. CPU 200 programs command buffer 204 and rendering engine 106 fetches commands from command buffer 204, which is shown in simplified form, but in practice may comprise one or more command buffers including a primary buffer (ring buffer) and one or more batch buffers. CPU 200 provides the initial image/texture data, and display engine 108 fetches pixel data from frame buffer 206 and sends the pixel data to external monitors for display. The output of rendering engine is put in the frame buffer, and CPU may read this back as the input for other purposes.

CPU 200 programs GPU 100 through GPU-specific commands using a producer-consumer model. The graphics driver programs GPU commands into command buffer 204, including the primary buffer and batch buffer(s), according to high-level programming APIs such as OpenGL, OpenCL and DirectX. GPU 100 then fetches and executed the commands. The primary buffer, a ring buffer, may chain other batch buffers together. The batch buffer is used to convey the majority of the commands (up to ~98%) per the programming model. In some embodiments, a register tuple (head, tail) is used to control the ring buffer. CPU 200 submits the commands to GPU 100 by updating tail, while the GPU fetches commands from head, and then notifies CPU 200 by updating head, after the commands have finished execution. Other embodiments may use different interface for command submission.

Figure 3:
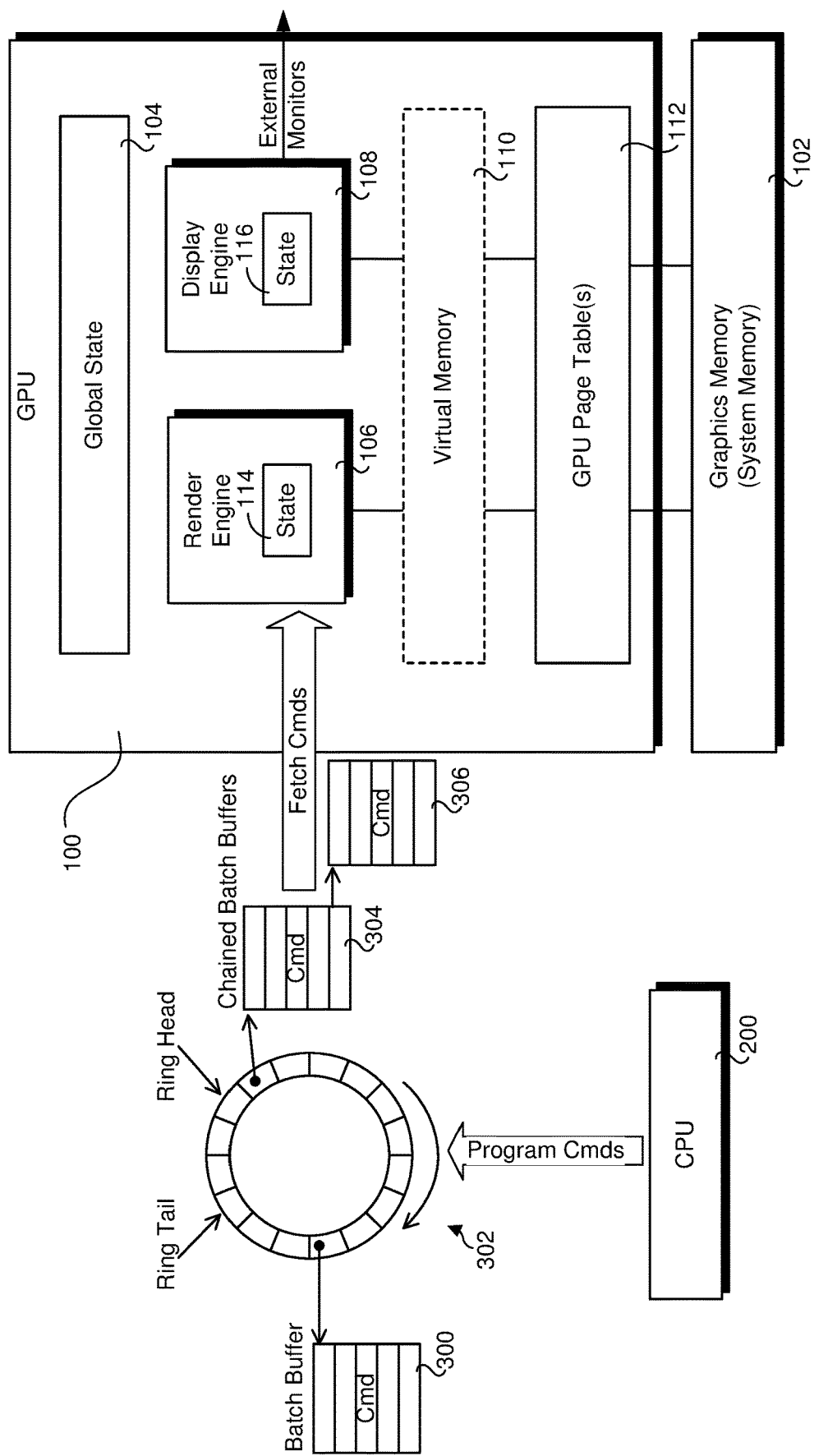

FIG. 3 shows further details of the GPU buffer configuration, according to one embodiment. The GPU buffers includes a batch buffer 300, a ring buffer 302, and chained batch buffers 304 and 306. As discussed above, the GPU driver (not shown) converts high-level application requests (e.g., via OpenGL, OpenCL, and DirectX, APIs) to hardware specific commands, puts the commands into the command buffer (including ring buffer 302 and batch buffer 300), and submits the commands by moving the Tail register of ring buffer 302. The ring buffer has 2 registers: head and tail indicating the ownership of commands in the ring: the CPU programs commands from tail to head, while the GPU fetches commands from head to tail. The CPU moves the tail registers and GPU updates the head register once the command is executed. In addition, there could be other programming model between CPU and GPU. In this example, ring buffer and batch buffers are also placed in the system memory. We separate them just for description purpose.

Figure 4:
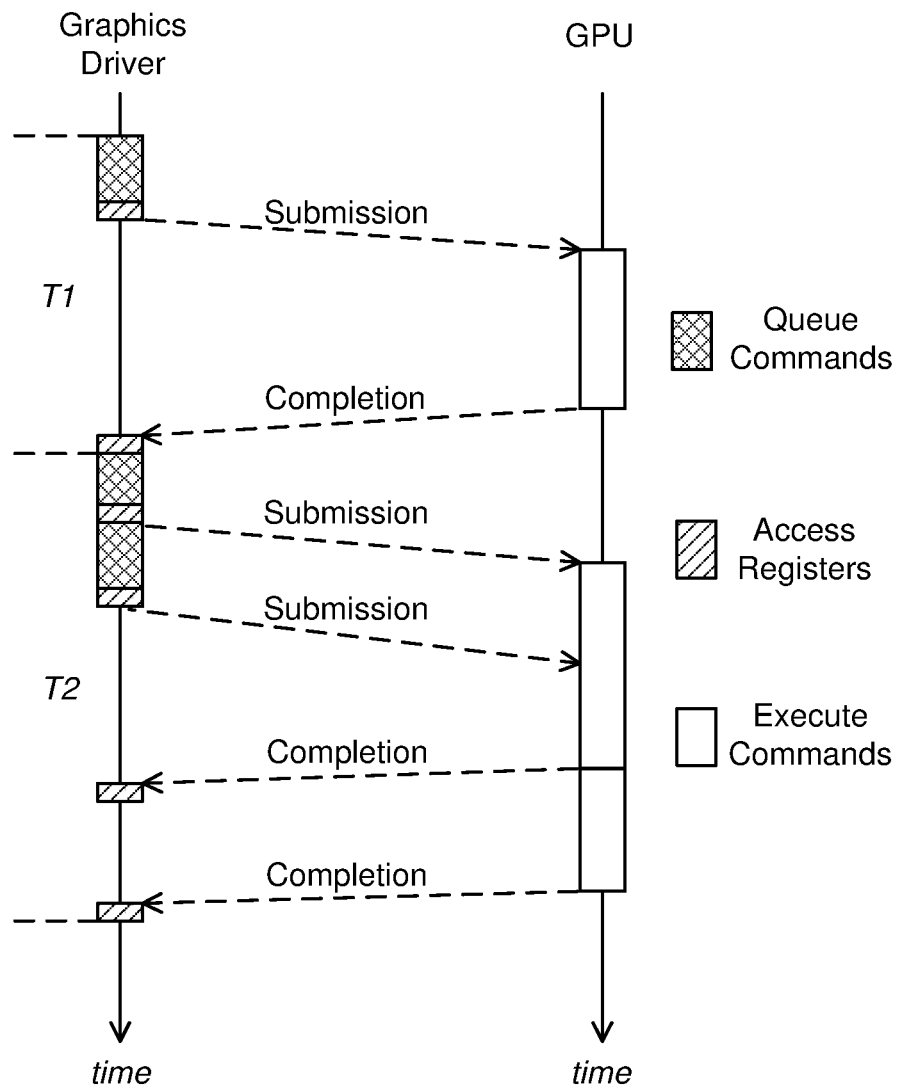
FIG. 4 depicts a process and message timeline illustrating operations performed by a graphics driver and GPU and messages transferred between the two to effect execute a sequence of GPU commands.

Another illustration of the how graphics commands are processed is depicted in FIG. 4, which shows a process and message timeline illustrating operations performed by a graphics driver and GPU and messages transferred between the two to execute graphics commands. The graphics driver queues graphics commands, which is submitted to the GPU for execution by writing a 'tail' register or other notification interface. Upon completion of submitted commands, the GPU returns a completion notification (e.g. a device interrupt) to the graphics driver, with information about the location in the command buffer where the GPU completes (e.g. in a 'head' register). This process continues on an ongoing basis.

Returning to FIG. 3, the massive GPU commands are usually put in batch buffer 300 or chained batch buffers 304 or 306, referenced by the ring buffer 302. Execution of those GPU commands changes the GPU state implicitly, including register states and graphics memory states, while those changes are difficult to be tracked by the driver on native operation system. Also no GPU has yet to implement a dirty memory tracking mechanism, like current mechanisms that use dirty-bits in CPU page tables to mark which pages are dirty. Thus, it is possible to know which graphics memory page is modified from CPU, but difficult to do so for modifications from GPU. This is the second major challenge why existing technologies can't capture incremental GPU state change to avoid dump complete GPU state for every checkpoint.

To provide fault-tolerance and high availability for the GPU intensive computing workloads, one solution is to run the GPU driver virtually and use a VM-based checkpointing solution, such as Remus mentioned above. A software GPU virtualization solution, such as the Xen split-driver model, can support VM checkpointing, but the performance of software GPU graphics (Gfx) virtualization is suboptimal and the features are very limited (e.g., this approach cannot support full GPU features). Dedicated pass through or shared pass through has reasonable GPU performance, but is lacking of the checkpointing support, due to the same reason on native that many GPU states are directly changed by GPU commands, which are no longer trapped by the VMM. As a result, the VMM is unable to snapshot and transport the state from PVM to SVM.

In accordance with aspects of the embodiments now described, techniques are disclosed for providing improved fault-tolerance and high availability for GPU intensive computing environments, such as GPGPU. The techniques take advantage of the GPU programming model to efficiently track the state of the guest GPU in combination with checkpointing, by introducing a command-based state tracker. This may be applied to both dedicated GFX pass-through (the GPU passed through to a VM exclusively) and shared GFX pass-through (the GPU is shared by multiple VMs, but each VM is passed through with a portion of GPU resource).

Under one embodiment, the following operations are employed. The guest access of I/O registers (including MMIO/PIO/PCI registers and/or GPU page tables if graphics virtual memory is implemented), are intercepted through CPU virtualization technology (e.g. Intel VT-x), to keep a copy of guest context per semantics, and/or emulate the guest operations, maintained as a vGPU device model. A MMU virtualization mechanism, such as hardware two-level page tables (e.g., Intel EPT (Extended Page Table)) or software shadow page table(s), is used to track dirty memory pages manipulated by the CPU, and perform a delta memory snapshot per checkpoint. The submission requests of GPU commands (e.g. write to the tail register) are intercepted through the aforementioned I/O interception, and commands are scanned before submission to predict: a) potential to-be-dirtied memory pages, which will be the candidates to be transferred per checkpoint; b) potential to-be-modified registers, which will be combined with register snapshot trapped from CPU accesses, and c) the execution time of intercepted commands, so the next checkpointing can be aligned to predicted execution time. The GPU commands from the guest are buffered, while checkpointing is in process, to avoid further damage to the GPU state. The GPU internal states are drained by flushing internal context/tlb/cache, at the completion of submitted commands, and then snapshot the vGPU state, based on tracked/predicted I/O state, GPU context (through GPU-specific commands) and trapped/predicted dirty memory pages. A course-grained command delivery mechanism is implemented under which large batch buffers may be broken down into multiple smaller buffers, to ensure one submission of the GPU commands may not take too long time for a non-preemptive GPU, so the aligned checkpoint time won't shift too much from the scheduled time.

Figure 5A:
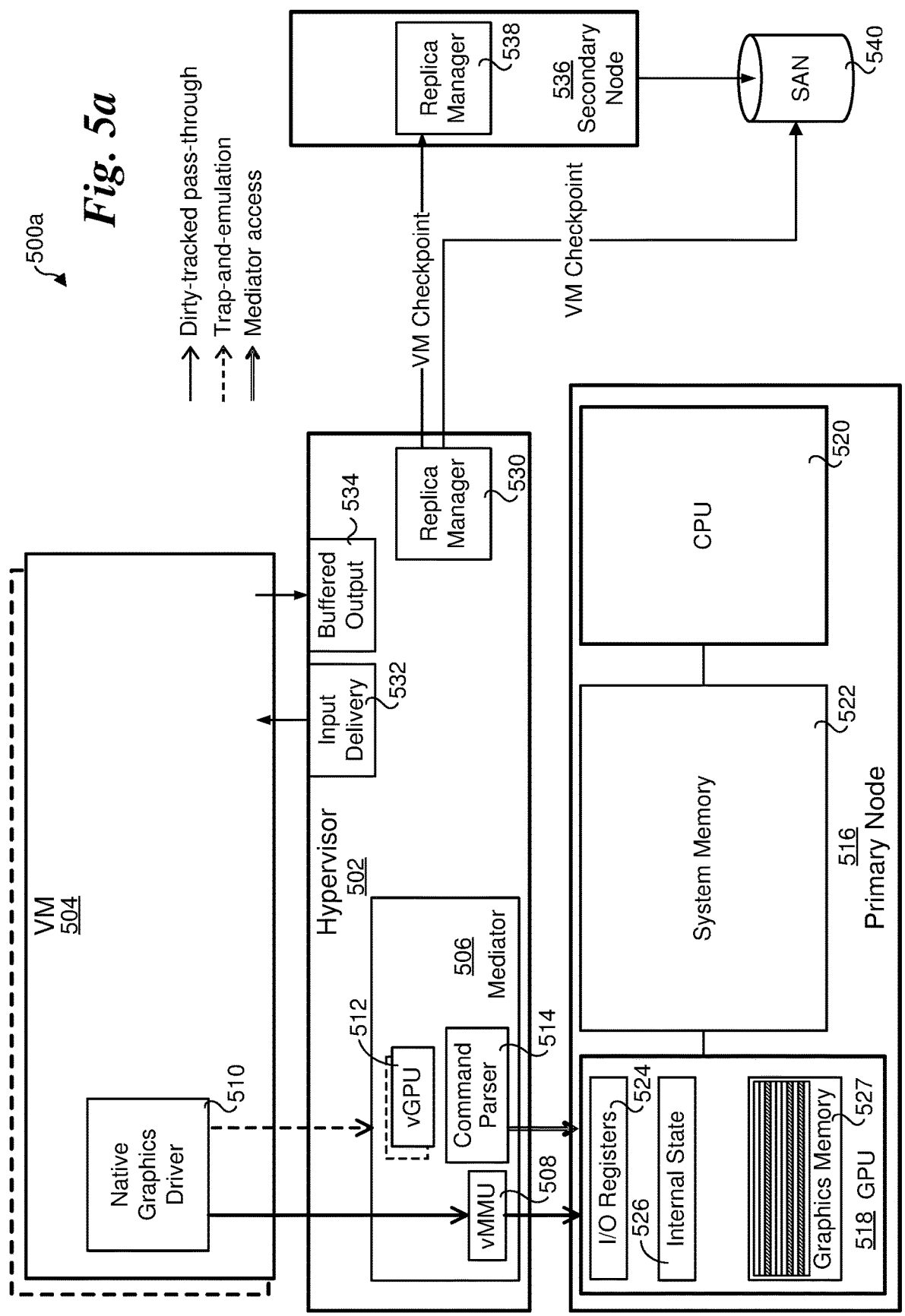
FIG. 5a is a block schematic diagram illustrating an architecture using a Type-1 hypervisor configured to implement aspects of the embodiments disclosed herein under which on-die GPU memory is used for graphics memory.

FIG. 5*a* illustrates an architecture 500*a* corresponding to one embodiment of a GPU virtualization implementation. Architecture 500*a* is based on the hypervisor model depicted as hypervisor 502, which hosts one of more VMs 504. In one embodiment, hypervisor 502 is a Type 1 "bare metal" hypervisor, which is a pure hypervisor that run directly on the compute platform hardware and hosts guest operating systems (OS's) in the VMs. A mediator driver 506 (also referred to herein simply as "mediator") extends the memory virtualization module (vMMU) 508 for user VMs and is configured to implement the policies of trap and passthrough, as described below in further detail. Each VM 504 hosts a guest operating system and runs a native graphics driver 510, and its access to the GPU is fully controlled by the mediator driver. To capture GPU state change, privileged resources, that is, the I/O registers and PTEs, corresponding accesses, from the graphics driver in user VMs, are trapped by mediator driver 506, and emulated via one or more virtual GPUs (vGPUs) 512. The emulation could be a direct forward to the physical GPU, in dedicated pass-through scenario, or a semantic emulation with context switch conducted by a GPU scheduler, in a shared pass-through scenario. The VM's access to graphics memory are passed through in a dirty-tracked pass-through mode, which causes a page fault on the first writes to the page and then allows following writes to be passed-through until the next checkpoint is made. Such page-level dirty tracking allows capturing of graphics memory pages are changed from the CPU. Mediator driver 506 also includes a command parser 514.

Figure 5B:
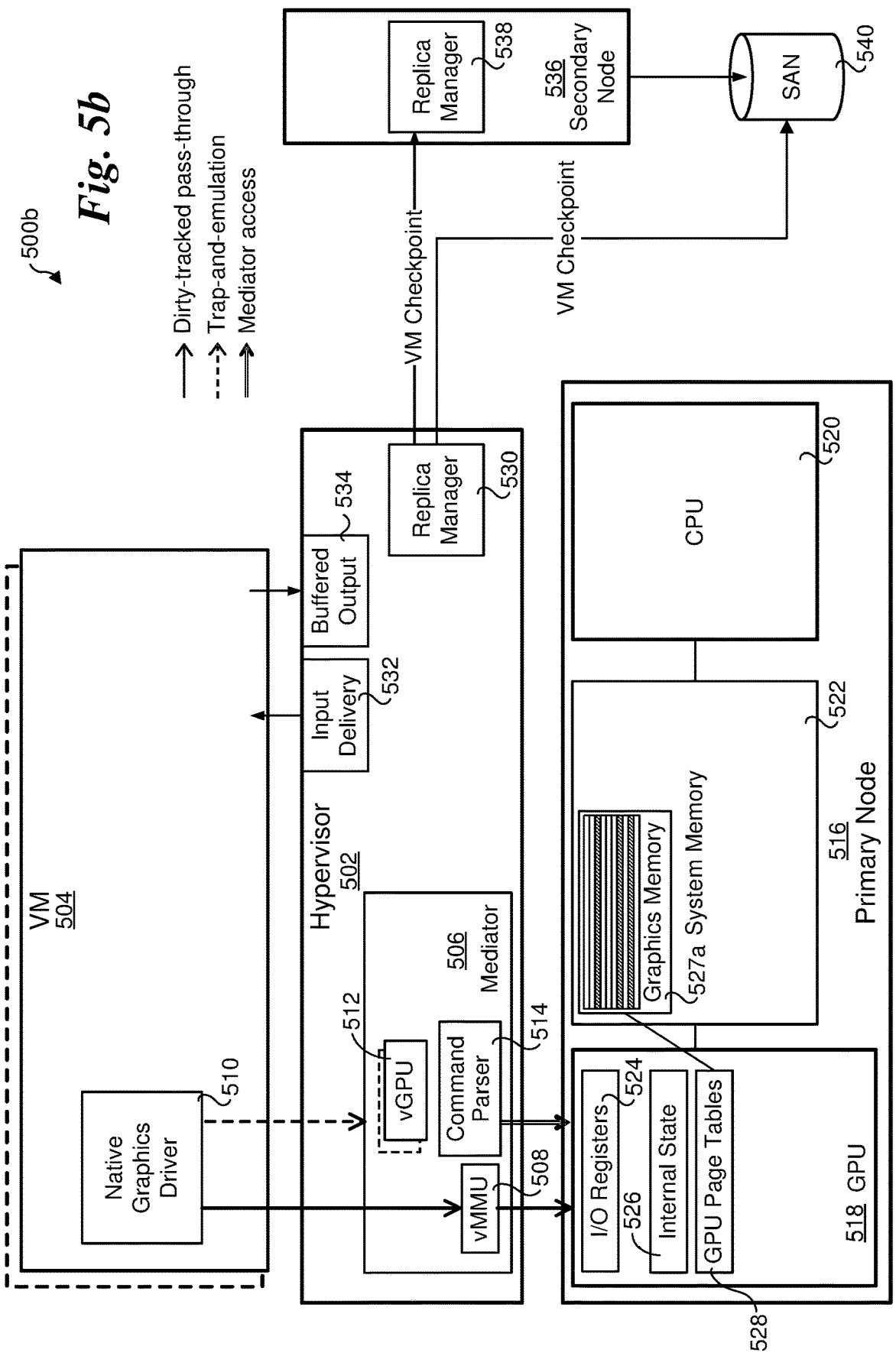
FIG. 5b is a block schematic diagram illustrating an architecture using a Type-1 hypervisor configured to implement aspects of the embodiments disclosed herein under which system memory is used for graphics memory.

VMM 502 is implemented on system hardware comprising a primary node 516, which includes a GPU 518, a CPU 520 and system memory 522, which may be accessed by each of CPU 522 and GPU 516. GPU 518 is further depicted with I/O registers 524, which include MMIO/PIO/PCI registers, internal state 526, and on-die graphics memory 527. Optionally, as shown in an architecture 500b of FIG. 5b, the GPU may access graphics memory in system memory 522, as depicted by graphics memory 527a. When the graphics memory accessed by GPU 518 is in system memory 522, GPU 518 further includes GPU page tables 528, in one embodiment. In another embodiment, the GPU page tables may be in system memory 522 (not shown). In this case, the GPU page table data can be intercepted through a memory write-protection mechanism, as what's used in the shadow page table. Internal state 526, is representative of the various GPU state information discussed herein.

As introduced earlier, the GPU state is composed of three blocks: 1) I/O registers accessed through I/O interface, 2) internal state invisible to software, but can be dumped through specific GPU commands, and 3) the graphics memory which can be either modified by the CPU or by the GPU.

In one embodiment, architecture 500a employs a VM checkpointing scheme that includes aspects that are similar to the Xen Remus checkpointing scheme discussed above. These aspects are illustrated by a replica manager 530, an input delivery block 532, and a buffer output block 534, a secondary node 536 including a replica manager 538, and a Storage Area Network (SAN) 540. Generally, SAN 540 is illustrative of any type of storage resource that is accessible via a network to which primary node 516 is connected. For example, the system hardware for primary node 516 will generally include a network adaptor or network interface controller (NIC) or the like (not shown).

In the checkpointing-based VM replication scheme, a VM checkpoint for a primary virtual machine (PVM) hosted on a primary node is periodically written by a replication manager on the primary node to one or both of a replica manager on a secondary node and a SAN storage device. VM packets sent out are buffered in buffer output block 534, and only flushed out until the next checkpoint is successfully completed by replica manager 530. The input delivery block duplicates the hardware packets to both PVM/SVM, to ensure SVM can successfully continue after a failover. Replica manager 530 controls when and how to generate a snapshot and to send snapshot to the secondary node. In the embodiments illustrated in FIGS. 5a, 5b, 5c, 5d, 5e, and 5f, replica manager 530 contacts mediator 506 for GPU state checkpointing.

Mediator driver 506 is configured to selectively trap or pass-through guest access of certain GPU resources. In one embodiment, CPU accesses to GPU states is implemented via trap and emulation under which: 1) CPU mapping to I/O resources 524 are removed from vMMU 508 (e.g., via an EPT), resulting in every access triggering a page table vault so the VMM/hypervisor can emulate and capture the state change; and 2) CPU access to graphics memory is trapped through log-dirty from vMMU 508, e.g., read-only for first access, record dirty page(s) and then open write permission.

Command parser 514 is used to scan commands and identify corresponding resource access and effects that access may have on such resources. This includes 1) prediction of to-be-dirtied memory pages, which will be candidates for transferred pages for a subsequent checkpoint; 2) to-be modified I/O registers, which may be merged with an I/O snapshot from CPU accesses; and 3) predict execution times for trapped commands. In one embodiment, the command parsing happens when the guest submits the command buffer, e.g. by write a 'tail' register. In another embodiment, the parsing could happen right before the mediator wants to submit the command buffer to the physical GPU. The parsing is based on the GPU command semantics, as defined by the GPU hardware specification. A GPU command may include explicit memory accesses specified in command operands, or include implicit memory accesses through some indirect structures. The parsing output is associated with the parsed command buffer, and will be used to update the GPU snapshot after the command buffer is successfully executed.

Mediator driver 506 manages vGPUs 512 of one or more VMs, and performs trapping and emulating of the privileged operations. In the shared pass-through case, a GPU scheduler may be further included in the mediator driver, to schedule command buffers from different guests in a timeshared manner. Context switches are conducted when switching from one VM to another VM. The mediator handles the physical GPU interrupt to know whether a given command buffer is successfully executed, and may generate virtual interrupts to designated VMs. The mediator will update the GPU snapshot, once a command buffer is successfully executed, according to previous parsed information: 1) prediction of to-be-dirtied memory pages, which will be candidates for transferred pages for a subsequent checkpoint; 2) to be modified I/O registers, which may be merged with a I/O snapshot from CPU accesses In one embodiment, command parser 514 employs some heuristics based on historical execution statistics, to predict the execution time of the next command buffer. The prediction may be communicated to replica manager 530, which will then choose the next checkpointing interval to align with the command execution time. In another embodiment, command parser 514 may split a large command buffer into multiple smaller command buffers, based on historical execution statistics, if the predicted execution time may be too large to fit an efficient checkpointing (otherwise a long buffer time may be incurred).

Figure 5C:
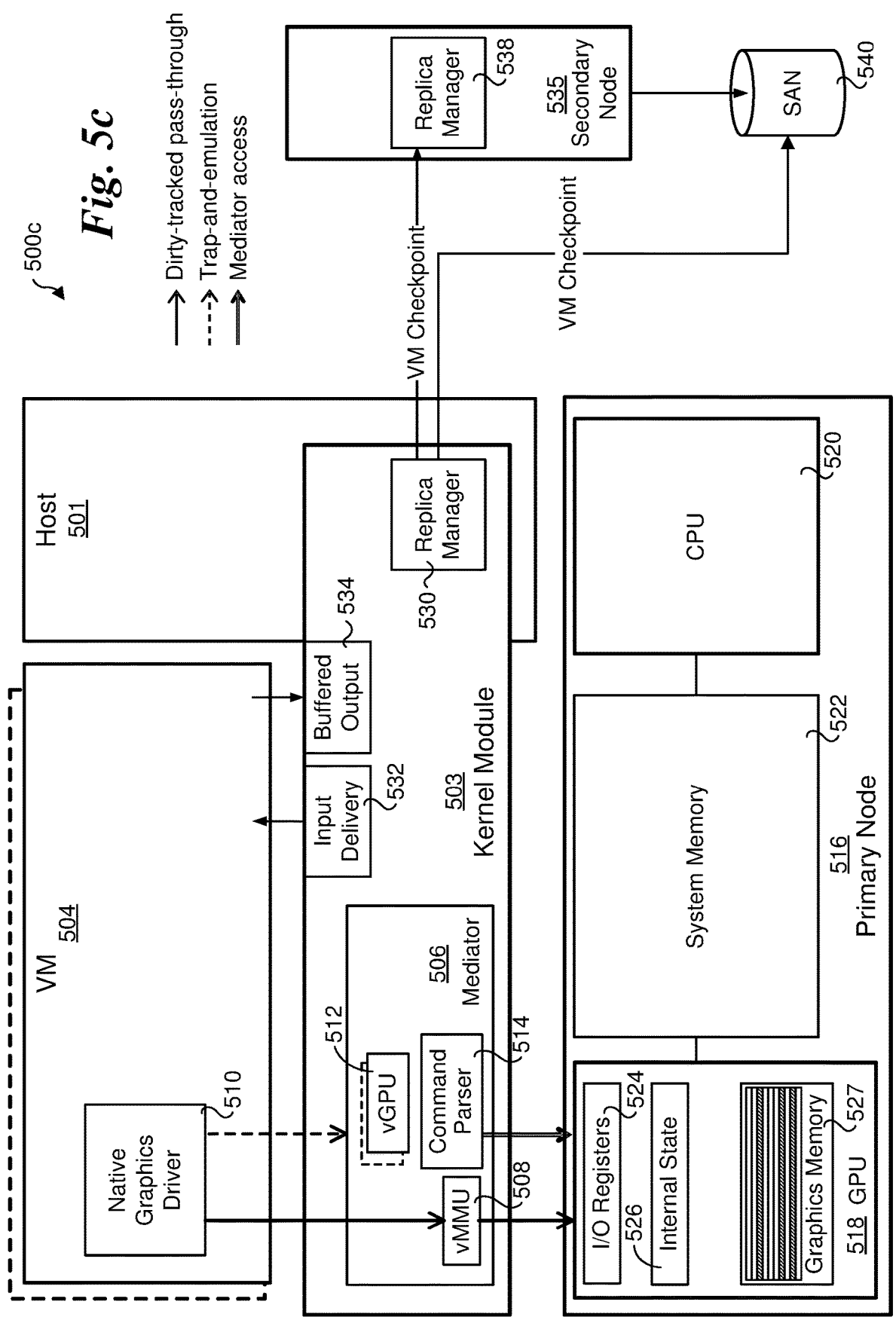
FIG. 5c is a block schematic diagram illustrating an architecture using the Type-2 hypervisor (kernel module and host) configured to implement aspects of the embodiments disclosed herein under which on-die GPU memory is used for graphics memory.
Figure 5D:
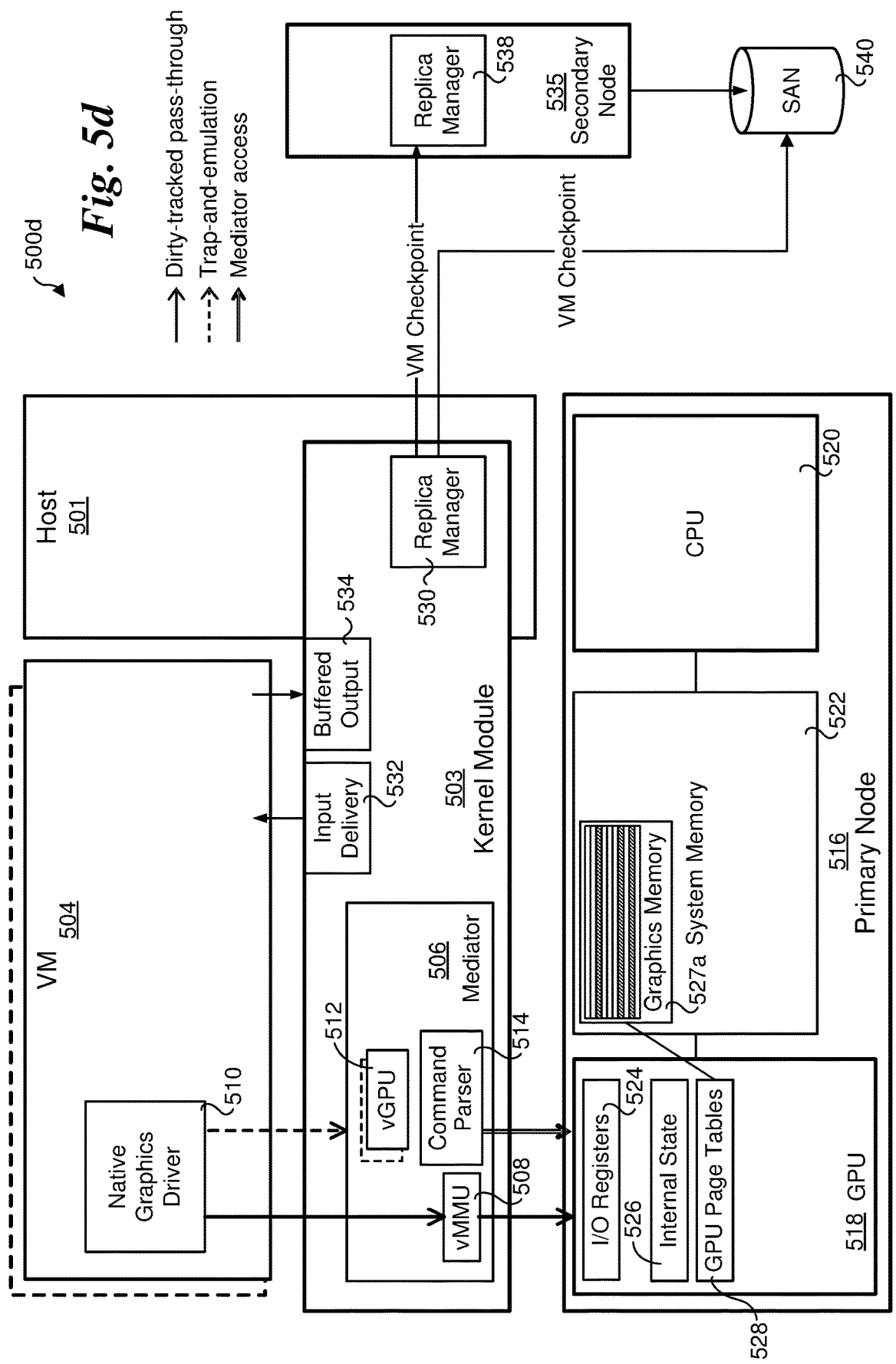
FIG. 5d is a block schematic diagram illustrating an architecture using the Type-2 hypervisor configured to implement aspects of the embodiments disclosed herein under which system memory is used for graphics memory.

FIG. 5c shows an architecture 500c that corresponds to one embodiment of a host model implementation of architecture 500a, where like-numbered components in architectures 500a and 500c perform similar operations. The primary differences between architectures 500a and 500c, is the host model includes a host 501 and a kernel module 503. FIG. 5d shows an architecture 500d having an optional configuration to architecture 500c under which graphic memory 527a is in system memory 522

Figure 5E:
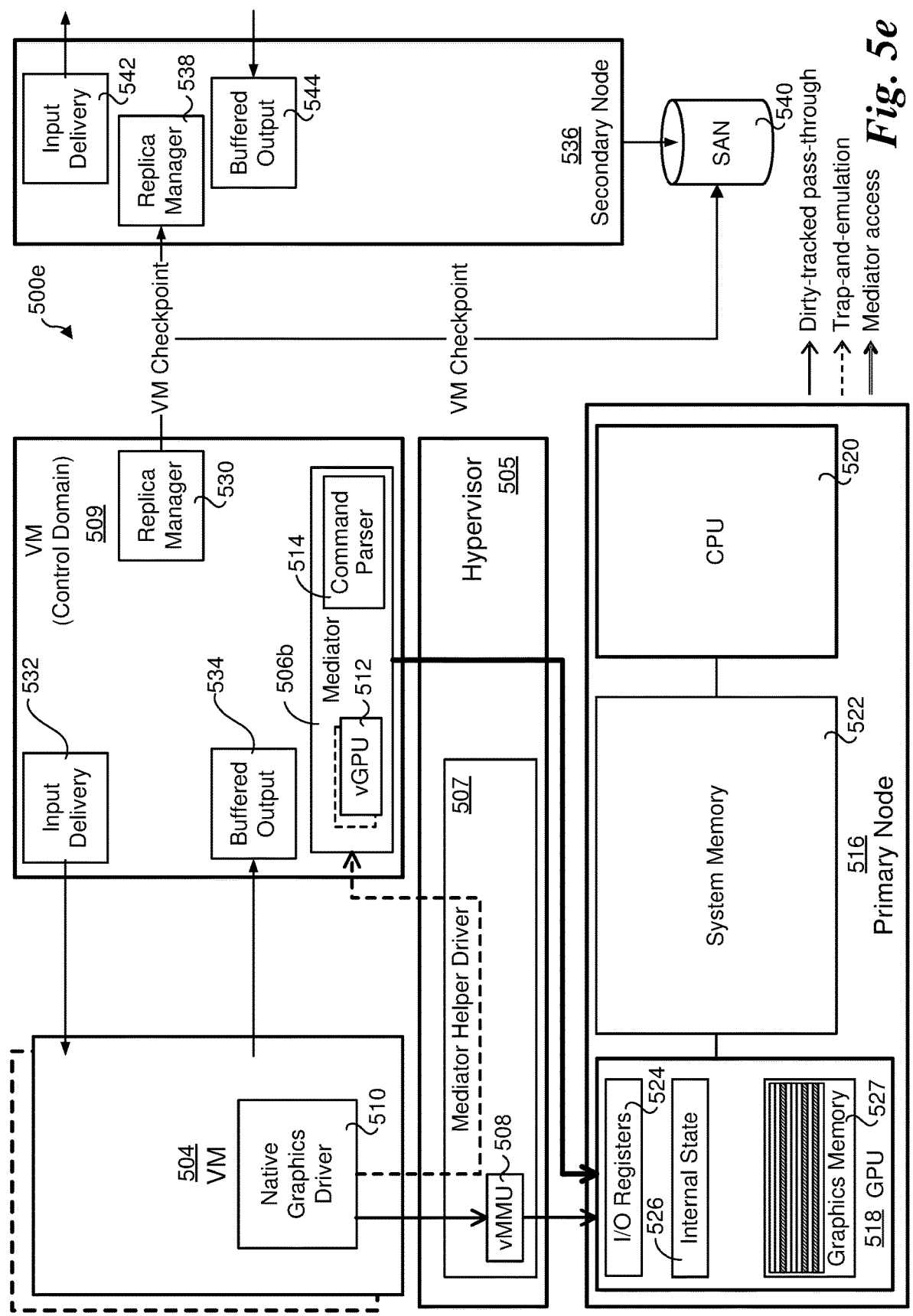
FIG. 5e is a block schematic diagram illustrating an architecture using a hybrid Type-1 hypervisor configured to implement aspects of the embodiments disclosed herein under which on-die GPU memory is used for graphics memory.

FIGS. 5e and 5f respectively show architecture 500e and 500f corresponding to embodiments of a hybrid hypervisor model. As before, like-numbered components in architectures 500a and 500e perform similar operations, as do like-numbered components in architectures 500b and 500f. Under the hybrid hypervisor model, a mediator helper driver 507 including vMMU 508 is implemented in a hypervisor 505, while each of a mediator 506b (including vGPU(s) 512 and a command parser 514), replica manager 530, input delivery block 532 and buffered output block 534 are implemented in a VM 509 that is operated as a control domain. One non-limiting example of a hybrid hypervisor model is the aforementioned Xen architecture.

Figure 6:
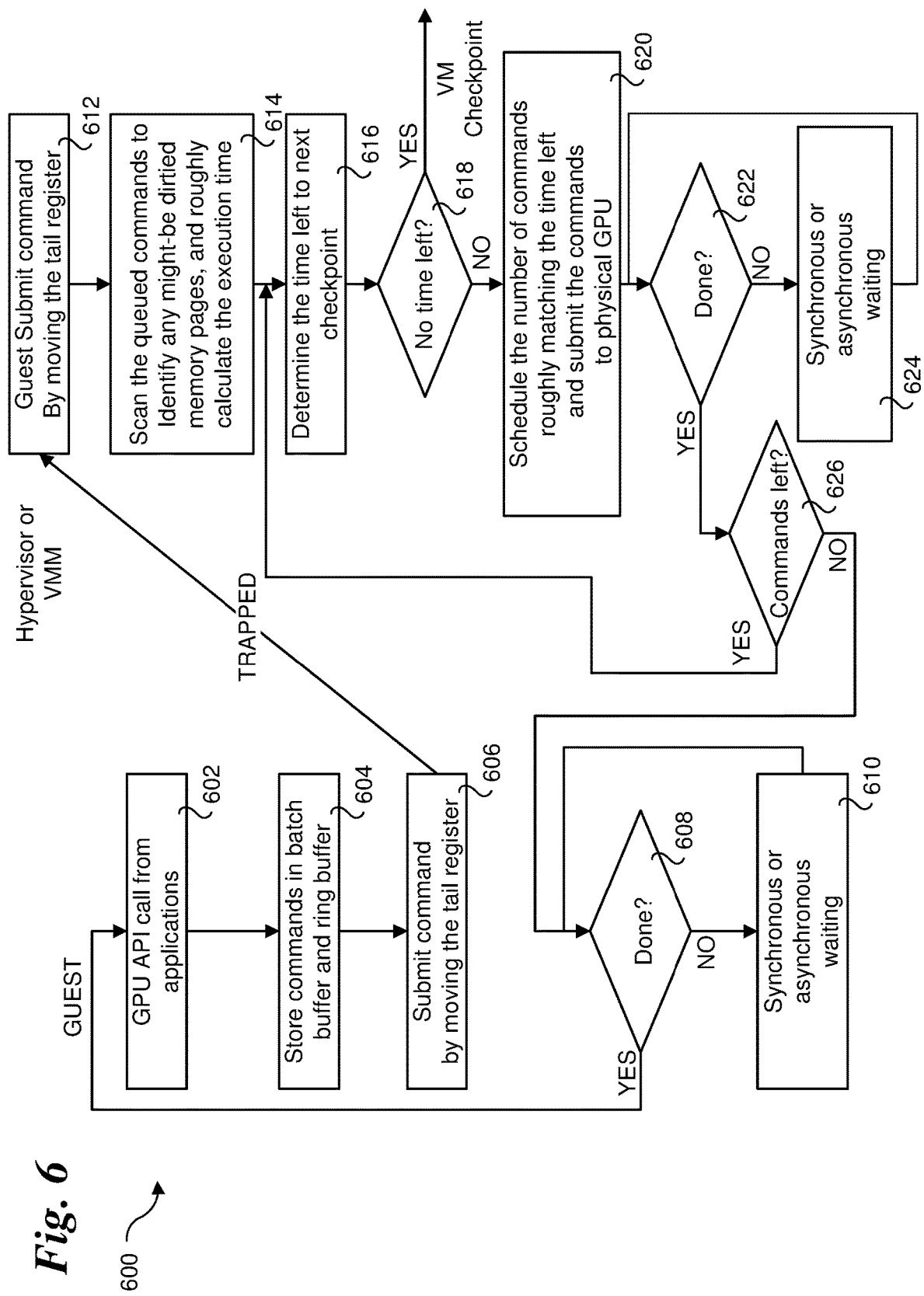
FIG. 6 is a flowchart illustrating operations and logic implemented by a guest and Hypervisor or VMM to facilitate GPU virtualization with VM checkpointing, according to one embodiment.

FIG. 6 shows a flowchart 600 illustrating operations and logic implement by a guest and a hypervisor or VMM to facilitate GPU virtualization with VM checkpointing, according to one embodiment. Beginning with operations performed by the guest, in a block 602 a GPU API call is received from an application. For example, applications may issue various GPU commands using an applicable API, such as OpenGL OpenCL, DirectX, etc. In a block 604, the GPU commands are stored in a batch buffer and the ring buffer (as applicable). The commands are then submitted by moving the tail registers in a block 606, in the manner described above. Up to this point, all of the operations in blocks 602, 604, and 606 correspond to conventional operations.

GPU commands or resource accesses submitted from a VM are intercepted or "trapped" by logic in mediator driver 506 and/or other mechanisms (not shown). Generally, logic or other mechanisms for trapping commands or resource accesses may be implemented in various manners, and a combination of logic and/or mechanisms may be used to trap different types of commands and resource accesses. For example, a GPU command/resource access inspector or the like may be implemented in a hypervisor or VMM, or otherwise in a component implemented in the hypervisor or VMM. In other cases, an interrupt mechanism or the like may be used to trap commands or resource accesses.

The right-side of flowchart 600 depicts ongoing operations performed by Hypervisor 502 in connection with trapped GPU commands/accesses. Block 612, shows the guest has submitted the command by moving the tail register. In a block 614, the queued commands are scanned to identify any memory pages that might-be dirtied via execution of the command via the GPU, and an approximate execute time is calculated. In a block 616 the time left to a next VM checkpoint is determined. In a decision block 618 a determination is made to whether there is any time left before VM checkpointing. If no time is left, a VM checkpointing operation is performed. If the answer is NO (i.e., there is time left), the logic proceeds to a block 620 in which the number of commands roughly matching the time left before VM checkpointing are scheduled and submitted to the physical GPU.

In a decision block 622, a determination is made to whether there are any remaining commands to schedule. If the answer is NO, synchronous or asynchronous waiting is performed in a block 624. If the answer to decision block 622 is YES, the logic proceeds to a decision block 626 to determine if there are any commands left. Is YES, the logic loops back to block 616. Once there are NO commands left, the logic returns to guest operations at a decision block 608.

In decision block 608 a determination is made to whether there are any more commands to issue to the GPU. If YES, the logic returns to block 602, and the operations of blocks 602, 604, 606 are repeated. As depicted by a block 610, the foregoing guest operations are repeated on an ongoing basis with synchronous or asynchronous waiting between loop iterations, as applicable.

In addition to the operations and logic shown in flowchart 600, guest access of graphics memory, such as the frame buffer and command buffer, are passed through in a dirty-tracking scheme, which imposes additional challenge to VM checkpointing. The dirty-tracking scheme causes a page fault only at the first write to the protected page, while all following guest writes to the same page are passed through. This allows the mediator to capture incremental CPU modifications to the graphics memory, at the page granularity level. Under architecture 500, the dirtied pages are tracked using vMMU 508.

During VM checkpointing, the output packets (containing the checkpoint data) are buffered during each epoch, and are released after the checkpoint is confirmed as successful. The VM checkpoint will include all of the dirtied memory pages accumulated during the past epoch, which includes both the dirtied pages tracked using the dirty-tracking scheme associated with frame buffer and command buffer accesses, and the predicted to-be dirtied pages. Each VM checkpoint will also include applicable GPU state Architecture 500 saves and restores internal pipeline state and I/O register states, plus cache/TLB (Translation Lookaside Buffer) flush, when generating the vGPU snapshot. The internal pipeline state is invisible to the CPU, but can be saved and restored through GPU commands. Saving/restoring I/O register states can be achieved through reads/writes to a list of the registers in the render context. Internal cache and TLB, included in modern GPUs to accelerate data accesses and address translations, are flushed using commands at render context switch, to guarantee isolation and correctness. The steps used to switch a context are: 1) save current I/O states, 2) flush the current context, 3) use the additional commands to save the current context, 4) use the additional commands to restore the new context, and 5) restore I/O state of the new context.

Exemplary Implementation Environment and Blade Server Architecture

It is envisioned that aspects of the embodiments herein may be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers.

As an overview, typical blade server components and systems are shown in FIGS. 7a-c, and 8. Under a typical configuration, a rack-mounted chassis 700 is employed to provide power and communication functions for a plurality of server blades (a.k.a., blades) 702, each of which occupies a corresponding slot. (It is noted that all slots in a chassis do not need to be occupied.) In turn, one or more chassis 700 may be installed in a blade server rack 703 shown in FIG. 7*c*. Each blade is coupled to an interface plane 704 (e.g., a backplane or mid-plane) upon installation via one or more mating connectors. Typically, the interface plane will include a plurality of respective mating connectors that provide power and communication signals to the blades, and including routed signal paths for coupling Ethernet signals between blades. Under current practices, many interface planes provide "hot-swapping" functionality—that is, blades can be added or removed ("hot-swapped") on the fly, without taking the entire chassis down through appropriate power and data signal buffering.

Figure 7A:
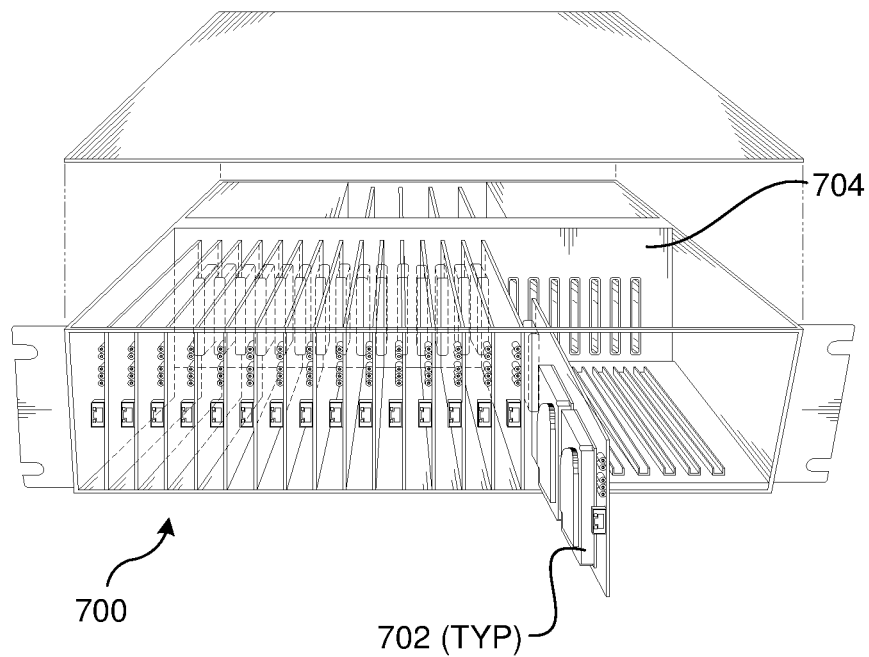
FIG. 7a is a frontal isometric view of an exemplary blade server chassis in which a plurality of server blades are installed.
Figure 7B:
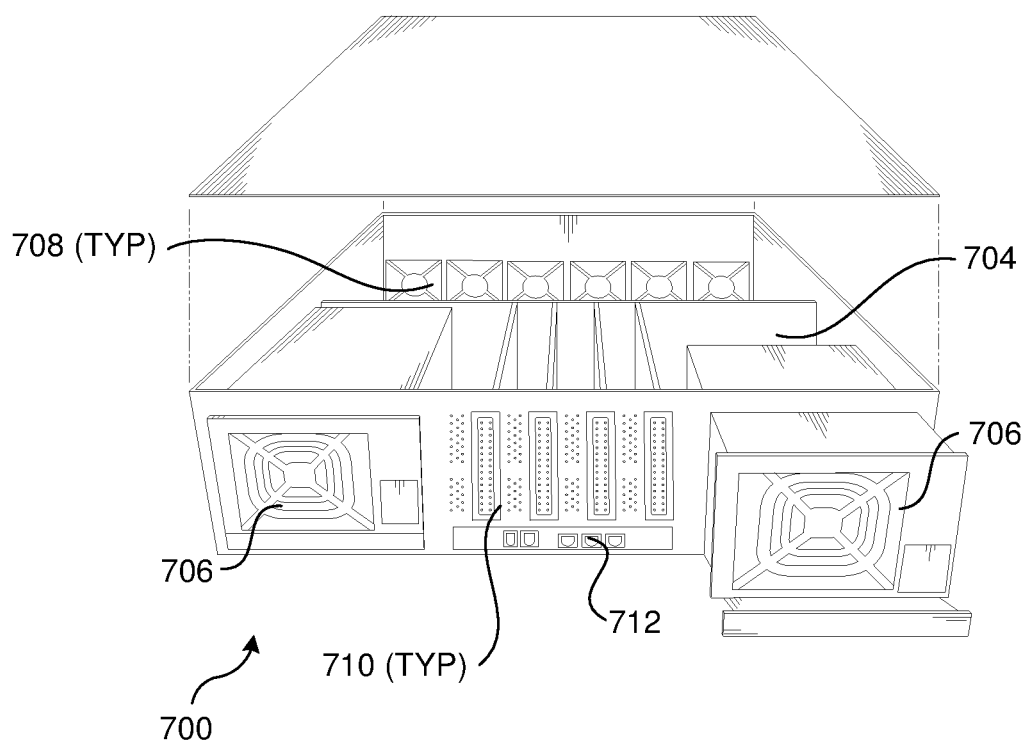
Figure 7C:
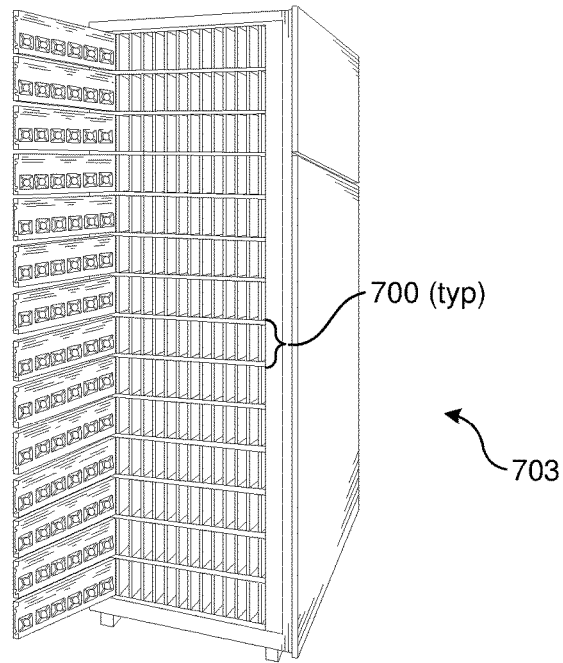
FIG. 7c is an isometric frontal view of an exemplary blade server rack in which a plurality of rack-mounted blade server chassis corresponding to FIGS. 8a and 8b are installed.

A typical mid-plane interface plane configuration is shown in FIGS. 7*a* and 7*b*. The backside of interface plane 704 is coupled to one or more power supplies 706. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 708 are employed to draw air through the chassis to cool the server blades.

An important feature required of all blade servers is the ability to communicate externally with other IT infrastructure. This is typically facilitated via one or more network connect cards 710, each of which is coupled to interface plane 704. Generally, a network connect card may include a physical interface comprising a plurality of network port connections (e.g., RJ-45 ports), or may comprise a high-density connector designed to directly connect to a network device, such as a network switch, hub, or router. It is noted that other network architectures may also be used, such as Top of Rack (ToR) switch architecture and disaggregated switch architectures, and the network links may comprise wired and/or optical cables.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 712 that is coupled to the backside or frontside of the interface plane. As yet another option, a management or configuration server may be employed to manage blade activities, wherein communications are handled via standard computer networking infrastructure, for example, Ethernet.

Figure 8:
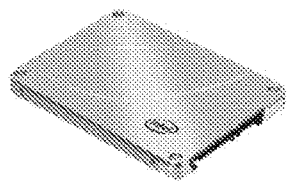
FIG. 8 shows details of the components of a typical server blade, according to one embodiment.
Figure 8:
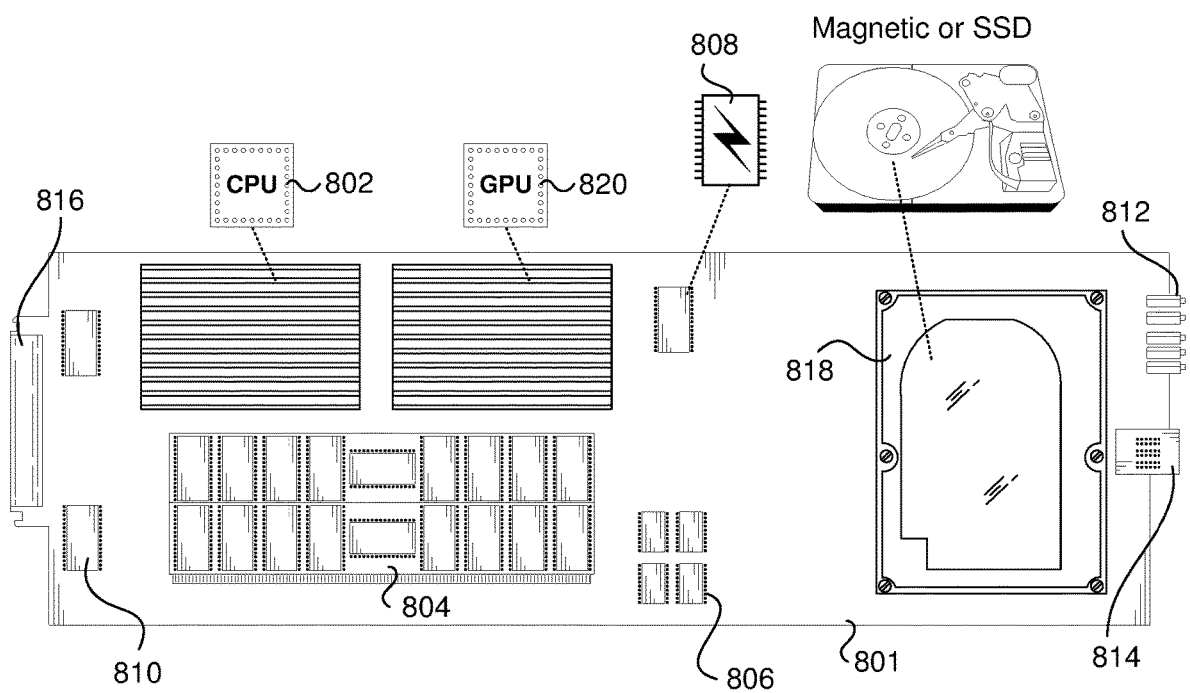

With reference to FIG. 8, further details of an exemplary blade 800 are shown. As discussed above, each blade comprises a separate computing platform that is configured to perform server-type functions, i.e., is a "server on a card." Accordingly, each blade includes components common to conventional servers, including a main printed circuit board (main board) 801 providing internal wiring (i.e., buses) for coupling appropriate integrated circuits (ICs) and other components mounted to the board. These components include one or more processors (a.k.a. CPUs) 802 coupled to system memory 804 (e.g., some form of Random Access Memory (RAM)), cache memory 806 (e.g., SDRAM), and a firmware storage device 808 (e.g., flash memory). A NIC (network interface controller) chip 810 is provided for supporting conventional network communication functions, such as to support communication between a blade and external network infrastructure. Other illustrated components include status LED (light-emitting diodes) 812, one or more RJ-45 Ethernet ports 814 (only one of which is shown for simplicity), and an interface plane connector 816. Additional components include various passive components (i.e., resistors, capacitors), power conditioning components, and peripheral device connectors.

Generally, each blade 800 may also provide on-board storage. This is typically facilitated via one or more built-in disk controllers and corresponding connectors to which one or more disk drives 818 are coupled. For example, typical disk controllers include SATA controllers, SCSI controllers, and the like. Generally, a disk drive 808 may comprise a magnetic drive or a solid state drive (SSD). As an option, the disk drives may be housed separate from the blades in the same or a separate rack, such as might be the case when a network-attached storage (NAS) appliance or backend storage sub-system that is employed for storing large volumes of data.

NIC 810 comprises circuitry and logic for facilitating corresponding networking operations, such as support for physical layer (L1) and data link layer operations (L2). Typically, upper layer operations are facilitated by an operating system network stack that would be hosted by an operating system running on processor 802. However, in some embodiments, a NIC may employ its own network stack via embedded logic or the like.

In addition to CPU(s) 802, a server blade may include one or more GPUs 820. Depending on the architecture, the GPU(s) may employ separate memory or may employ system memory, such as employed by the embodiments illustrated herein. Generally, today's server processors employ System on a Chip (SoC) architectures, under which multiple functional components, blocks, and interfaces are integrated on a chip. Under some SoC architectures, a processor includes a CPU comprising multiple cores and circuitry corresponding to one or more GPUs.

In a typical data center deployment, network switching elements comprise rack-mounted equipment, such as would occupy a 1U, 2U, or 4U slot, or may be implemented via one or more server blades. Optionally, a network switching element may be implemented use one or more server blades.

Further aspects of the subject matter described herein are set out in the following numbered clauses:

1. A method comprising:
   implementing at least one virtual machine (VM) on a compute platform including a central processing unit (CPU), a graphics processing unit (GPU), and graphics memory, each of the at least one virtual machine hosted by a hypervisor executed via the CPU;
   for each of at least one VM,
   trapping GPU commands submitted from the VM;
   emulating, using a virtual GPU associated with the VM, changes to state information for the GPU that are predicted to result when the trapped GPU commands are executed by the GPU;
   predicting graphics memory pages that might be dirtied via execution of trapped GPU commands by the GPU; and
   periodically performing a VM checkpointing operation for the VM, wherein a snapshot of changes to the state information for the GPU and a copy of the graphics memory pages that are predicted to-be-dirtied are stored as a VM checkpoint.

2. The method of clause 1, further comprising:
predicting execution times of a command or batch of commands that have been trapped; and
determining, based on the predicted execution times, which trapped commands to submit to the GPU prior to performing a next checkpointing operation.

3. The method of clause 1 or clause 2, further comprising:
scanning trapped GPU commands submitted by a given VM through a command parser; and
emulating accesses to at least one of GPU Input/Output (I/O) registers and one or more GPU page tables using the virtual GPU associated with the given VM.

4. The method of clause 1, further comprising:
passing through certain accesses to the graphics memory and marking graphics memory pages that are predicted to-be-dirtied as a result of the certain accesses to graphics memory; and
including a copy of the graphic memory pages that are predicted to-be-dirtied as a result of the certain accesses to the graphics memory in the VM checkpoint.

5. The method of clause 4, wherein the certain accesses to the graphics memory that are passed through include accesses to a display buffer and a command buffer in the graphics memory.

6. The method of clause 4, wherein the certain accesses to the graphics memory that are passed through include accesses to the graphics memory by the CPU.

7. The method of any of the preceding clauses, wherein the GPU includes an internal context, translation look-aside buffer, and cache, the method further comprising draining GPU internal state data by flushing the internal GPU context, translation look-aside buffer and cache in connection with taking a snapshot of the changes to the state information for the GPU.

8. The method of any of the preceding clauses, further comprising buffering commands submitted from a VM during a VM checkpointing operation.

9. The method of any of the preceding clauses, wherein the hypervisor is a Type-1 hypervisor.

10. The method of any of clauses 1-8, wherein the hypervisor is a Type-2 hypervisor.

11. The method of any of clauses 1-8, wherein the hypervisor is implemented in a Type-1 hybrid hypervisor architecture including a VM operating as a control domain.

12. The method of any of the proceeding clauses, wherein the graphics memory comprises memory on-die the GPU.

13. The method of any of the proceeding clauses, wherein the computer platform includes system memory, and wherein the graphics memory comprises a portion of system memory.

14. A tangible non-transient machine readable medium having instructions comprising a plurality of software modules stored thereon, configured to be implemented on a compute platform having a central processing unit (CPU), a graphics processing unit (GPU), and graphics memory, the compute platform further configured to execute a hypervisor on the CPU that hosts at least one virtual machine (VM) hosting a guest operating system including a graphics driver, wherein upon execution the instructions enable the compute platform to:
for each of at least one VM hosting a guest operating system including a graphics driver, trap commands issued from the graphics driver of the VM to be executed by the GPU;
trap accesses to predetermined GPU resources made by the graphics driver;
emulate execution of the commands and accesses to the GPU resources using a virtual GPU associated with the VM, the virtual GPU including state information;
track state information for the virtual GPU,
pass through certain accesses from the graphics driver to the graphics memory while marking graphics memory pages modified by the certain accesses as dirtied;
periodically performing a VM checkpointing operation for the VM, wherein a snapshot of current tracked state information for the virtual GPU and a copy of the graphics memory pages that are dirtied are stored as a VM checkpoint; and
submit the trapped commands and accesses to the GPU.

15. The tangible non-transient machine readable medium of clause 14, wherein execution of the instructions further enables the compute platform to:
scan the commands that are trapped via a command parser;
predict graphics memory pages that may be potentially dirtied via execution of a trapped command or batch of trapped commands by the GPU; and
include the content of the graphics memory pages that are predicted to be potentially dirtied as part of the VM checkpoint.

16. The tangible non-transient machine readable medium of clause 14 or 15, wherein execution of the instructions further enables the compute platform to:
predict execution times of a command or batch of commands; and
determine, based on the predicted execution times, which commands to submit to the GPU prior to performing a next checkpointing operation.

17. The tangible non-transient machine readable medium of any of clauses 14-16, wherein execution of the instructions further enables the compute platform to:
scantrapped commands submitted by a graphics driver for a given VM through a command parser; and
emulate accesses to at least one of GPU Input/Output (I/O) registers and one or more GPU page tables using the virtual GPU associated with the given VM.

18. The tangible non-transient machine readable medium of any of clauses 14-17, wherein execution of the instructions further enables the compute platform to:
detect GPU accesses to a display buffer or command buffer; and
track dirty graphics memory pages resulting from the GPU accesses to the display buffer and command buffer.

19. The tangible non-transient machine readable medium of any of clauses 14-18, wherein execution of the instructions further enables the compute platform to buffer commands submitted to the GPU during a VM checkpointing operation.

20. The tangible non-transient machine readable medium of any of clauses 14-19, wherein execution of the instructions further enables the compute platform to flush a translation look-aside buffer and cache for the GPU during each VM checkpoint.

21. The tangible non-transient machine readable medium of any of clauses 14-20, wherein the plurality of modules include:
a mediator module configured to be implemented in a hypervisor.

22. The tangible non-transient machine readable medium of any of clauses 10-21, wherein the plurality of modules include:

a mediator module configured to be hosted by a VM; and
a mediator helper module associated with the mediator module configured to be implemented in the hypervisor.

23. The tangible non-transient machine readable medium of clause 22, wherein the mediator helper module includes logic for trapping commands and forwarding trapped commands to the mediator.

24. The tangible non-transient machine readable medium of any of clauses 14-23, wherein the hypervisor is implemented in a Type-1 hybrid hypervisor architecture, and the mediator is implemented in a VM operating as a control domain under the Type-1 hybrid hypervisor architecture.

25. A system comprising:
a main board on which a plurality of components are mounted and interconnected, including,
a central processing unit (CPU);
a graphics processing unit (GPU)
memory, operatively coupled to each of the GPU and CPU; and
a storage device, operatively coupled to the CPU;
wherein instructions reside in at least one of the memory and storage device comprising a plurality of software modules configured to be executed by the CPU and GPU, the software modules including a hypervisor that is configured to be executed by the CPU and host at least one virtual machine (VM) hosting a guest operating system including a graphics driver, wherein upon execution the instructions enable the system to:
for each of at least one VM hosting a guest operating system including a graphics driver, trap commands issued from the graphics driver of the VM to be executed by the GPU;
trap accesses to predetermined GPU resources made by the graphics driver;
emulate execution of the commands and accesses to the GPU resources using a virtual GPU associated with the VM, the virtual GPU including state information;
track state information for the virtual GPU,
pass through certain accesses from the graphics driver to the graphics memory while marking graphics memory pages modified by the certain accesses as dirtied;
periodically performing a VM checkpointing operation for the VM, wherein a snapshot of current tracked state information for the virtual GPU and a copy of the graphics memory pages that are dirtied are stored as a VM checkpoint; and
submit the trapped commands and accesses to the GPU.

26. The system of clause 25, wherein execution of the instructions further enables the system to:
scan the commands that are trapped via a command parser;
predict graphics memory pages that may be potentially dirtied via execution of a trapped command or batch of trapped commands by the GPU; and
include the content of the graphics memory pages that are predicted to be potentially dirtied as part of the VM checkpoint.

27. The system of clause 25 or 26, wherein execution of the instructions further enables the system to:
predict execution times of a command or batch of commands; and
determine, based on the predicted execution times, which commands to submit to the GPU prior to performing a next checkpointing operation.

28. The system of any of clauses 25-27, wherein execution of the instructions further enables the system to:

scantrapped commands submitted by a graphics driver for a given VM through a command parser; and
emulate accesses to at least one of GPU Input/Output (I/O) registers and one or more GPU page tables using the virtual GPU associated with the given VM.

29. The system of any clauses 25-28, wherein execution of the instructions further enables the system to:
detect GPU accesses to a display buffer or command buffer; and
track dirty graphics memory pages resulting from the GPU accesses to the display buffer and command buffer.

30. The system of any clauses 25-29, wherein the certain accesses to the graphics memory that are passed through include accesses to the graphics memory by the CPU.

31. The system of any clauses 25-29, wherein the GPU includes an internal context, translation look-aside buffer, and cache, wherein execution of the instructions further enables the system to drain GPU internal state data by flushing the internal GPU context, translation look-aside buffer and cache in connection with taking a snapshot of the changes to the state information for the GPU.

32. The system of any clauses 25-31, wherein execution of the instructions further enables the system to buffer commands submitted from a VM during a VM checkpointing operation.

33. The system of any clauses 25-32, wherein the hypervisor is a Type-1 hypervisor.

34. The system of any clauses 25-32, wherein the hypervisor is a Type-2 hypervisor.

35. The system of any of clauses 25-32, wherein the hypervisor is implemented in a Type-1 hybrid hypervisor architecture including a VM operating as a control domain.

35. The system of any clauses 25-35, wherein the GPU includes on-die memory that is implemented as graphics memory.

36. The system of any clauses 25-35, wherein a portion of the memory is implemented as graphics memory.

37. A tangible non-transient machine readable medium having instructions comprising a plurality of software modules stored thereon configured to be executed on a compute platform including a central processing unit (CPU), a graphics processing unit (GPU), and system memory, wherein execution of the instructions performs the method of any of clauses 1-12.

38. A system comprising:
a main board on which a plurality of components are mounted and interconnected, including,
a central processing unit (CPU);
a graphics processing unit (GPU)
memory, operatively coupled to each of the GPU and CPU; and
means for,
for each of at least one virtual machine (VM) hosting a guest operating system including a graphics driver,
trapping commands issued from the graphics driver of the VM to be executed by the GPU;
trapping accesses to predetermined GPU resources made by the graphics driver;
emulating execution of the commands and accesses to the GPU resources using a virtual GPU associated with the VM, the virtual GPU including state information;
tracking state information for the virtual GPU,
passing through certain accesses from the graphics driver to the graphics memory while marking graphics memory pages modified by the certain accesses as dirtied;

periodically performing a VM checkpointing operation for the VM, wherein a snapshot of current tracked state information for the virtual GPU and a copy of the graphics memory pages that are dirtied are stored as a VM checkpoint; and submitting the trapped commands and accesses to the GPU.

39. The system of clause 38, further comprising means for:

scanning the commands that are trapped via a command parser;

predicting graphics memory pages that may be potentially dirtied via execution of a trapped command or batch of trapped commands by the GPU; and including the content of the graphics memory pages that are predicted to be potentially dirtied as part of the VM checkpoint.

40. The system of clause 38 or 39, further comprising means for:

predicting execution times of a command or batch of commands; and determining, based on the predicted execution times, which commands to submit to the GPU prior to performing a next checkpointing operation.

41. The system of any of clauses 38-40, further comprising means for:

scanning trapped commands submitted by a graphics driver for a given VM through a command parser; and emulating accesses to at least one of GPU Input/Output (I/O) registers and one or more GPU page tables using the virtual GPU associated with the given VM.

42. The system of any clauses 38-41, further comprising means for:

detecting GPU accesses to a display buffer or command buffer; and tracking dirty graphics memory pages resulting from the GPU accesses to the display buffer and command buffer.

43. The system of any clauses 38-42, wherein the certain accesses to the graphics memory that are passed through include accesses to the graphics memory by the CPU.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or device processor or software and/or firmware executed by an embedded processor or the like. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

The invention claimed is:

1. A method comprising:
    implementing at least one virtual machine (VM) on a compute platform including a central processing unit (CPU), a graphics processing unit (GPU), and graphics memory, each of the at least one virtual machine hosted by a hypervisor executed via the CPU;
    for each of at least one VM,
        trapping GPU commands submitted from the VM;
        emulating, using a virtual GPU associated with the VM, changes to state information for the GPU that are predicted to result when the trapped GPU commands are executed by the GPU;
        predicting graphics memory pages that might be dirtied via execution of trapped GPU commands by the GPU; and
        periodically performing a VM checkpointing operation for the VM, wherein a snapshot of changes to the state information for the GPU and a copy of the graphics memory pages that are predicted to-be-dirtied are stored as a VM checkpoint.

2. The method of claim 1, further comprising:
    predicting execution times of a command or batch of commands that have been trapped; and
    determining, based on the predicted execution times, which trapped commands to submit to the GPU prior to performing a next checkpointing operation.

3. The method of claim 1, further comprising:
    scanning trapped GPU commands submitted by a given VM through a command parser; and
    emulating accesses to at least one of GPU Input/Output (I/O) registers and one or more GPU page tables using the virtual GPU associated with the given VM.

4. The method of claim 1, further comprising:
    passing through certain accesses to the graphics memory and marking graphics memory pages that are predicted to-be-dirtied as a result of the certain accesses to graphics memory; and
    including a copy of the graphic memory pages that are predicted to-be-dirtied as a result of the certain accesses to the graphics memory in the VM checkpoint.

5. The method of claim 4, wherein the certain accesses to the graphics memory that are passed through include accesses to a display buffer and a command buffer in the graphics memory.

6. The method of claim 4, wherein the certain accesses to the graphics memory that are passed through include accesses to the graphics memory by the CPU.

7. The method of claim 1, wherein the GPU includes an internal context, translation look-aside buffer, and cache, the method further comprising draining GPU internal state data by flushing the internal GPU context, translation look-aside buffer and cache in connection with taking a snapshot of the changes to the state information for the GPU.

8. The method of claim 1, further comprising buffering commands submitted from a VM during a VM checkpointing operation.

9. The method of claim 1, wherein the hypervisor is a Type-1 hypervisor.

10. A tangible non-transient machine readable medium having instructions comprising a plurality of software modules stored thereon, configured to be implemented on a compute platform having a central processing unit (CPU), a graphics processing unit (GPU), and graphics memory, the compute platform further configured to execute a hypervisor on the CPU that hosts at least one virtual machine (VM) hosting a guest operating system including a graphics driver, wherein upon execution the instructions enable the compute platform to:
    for each of at least one VM hosting a guest operating system including a graphics driver,
        trap commands issued from the graphics driver of the VM to be executed by the GPU;
        trap accesses to predetermined GPU resources made by the graphics driver;
        emulate execution of the commands and accesses to the GPU resources using a virtual GPU associated with the VM, the virtual GPU including state information;
        track state information for the virtual GPU,
        pass through certain accesses from the graphics driver to the graphics memory while marking graphics memory pages modified by the certain accesses as dirtied;

periodically performing a VM checkpointing operation for the VM, wherein a snapshot of current tracked state information for the virtual GPU and a copy of the graphics memory pages that are dirtied are stored as a VM checkpoint; and submit the trapped commands and accesses to the GPU.

11. The tangible non-transient machine readable medium of claim 10, wherein execution of the instructions further enables the compute platform to:

scan the commands that are trapped via a command parser;

predict graphics memory pages that may be potentially dirtied via execution of a trapped command or batch of trapped commands by the GPU; and include the content of the graphics memory pages that are predicted to be potentially dirtied as part of the VM checkpoint.

12. The tangible non-transient machine readable medium of claim 10, wherein execution of the instructions further enables the compute platform to:

predict execution times of a command or batch of commands; and determine, based on the predicted execution times, which commands to submit to the GPU prior to performing a next checkpointing operation.

13. The tangible non-transient machine readable medium of claim 10, wherein execution of the instructions further enables the compute platform to:

scan trapped commands submitted by a graphics driver for a given VM through a command parser; and emulate accesses to at least one of GPU Input/Output (I/O) registers and one or more GPU page tables using the virtual GPU associated with the given VM.

14. The tangible non-transient machine readable medium of claim 10, wherein execution of the instructions further enables the compute platform to:

detect GPU accesses to a display buffer or command buffer; and track dirty graphics memory pages resulting from the GPU accesses to the display buffer and command buffer.

15. The tangible non-transient machine readable medium of claim 10, wherein execution of the instructions further enables the compute platform to buffer commands submitted to the GPU during a VM checkpointing operation.

16. The tangible non-transient machine readable medium of claim 10, wherein execution of the instructions further enables the compute platform to flush a translation lookaside buffer and cache for the GPU during each VM checkpoint.

17. The tangible non-transient machine readable medium of claim 10, wherein the plurality of modules include:

a mediator module configured to be implemented in a hypervisor.

18. The tangible non-transient machine readable medium of claim 10, wherein the plurality of modules include:

a mediator module configured to be hosted by a VM; and a mediator helper module associated with the mediator module configured to be implemented in the hypervisor.

19. The tangible non-transient machine readable medium of claim 18, wherein the mediator helper module includes logic for trapping commands and forwarding trapped commands to the mediator.

20. The tangible non-transient machine readable medium of claim 10, wherein the hypervisor is implemented in a Type-1 hybrid hypervisor architecture, and the mediator is implemented in a VM operating as a control domain under the Type-1 hybrid hypervisor architecture.

21. A system comprising:

a main board on which a plurality of components are mounted and interconnected, including, a central processing unit (CPU);

a graphics processing unit (GPU);

memory, operatively coupled to each of the CPU and GPU; and a storage device, operatively coupled to the CPU;

wherein instructions reside in at least one of the memory and storage device comprising a plurality of software modules configured to be executed by the CPU and GPU, the software modules including a hypervisor that is configured to be executed by the CPU and host at least one virtual machine (VM) hosting a guest operating system including a graphics driver, wherein upon execution the instructions enable the system to:

for each of at least one VM hosting a guest operating system including a graphics driver, trap commands issued from the graphics driver of the VM to be executed by the GPU;

trap accesses to predetermined GPU resources made by the graphics driver;

emulate execution of the commands and accesses to the GPU resources using a virtual GPU associated with the VM, the virtual GPU including state information;

track state information for the virtual GPU, pass through certain accesses from the graphics driver to the graphics memory while marking graphics memory pages modified by the certain accesses as dirtied;

periodically performing a VM checkpointing operation for the VM, wherein a snapshot of current tracked state information for the virtual GPU and a copy of the graphics memory pages that are dirtied are stored as a VM checkpoint; and submit the trapped commands and accesses to the GPU.

22. The system of claim 21, wherein execution of the instructions further enables the system to:

scan the commands that are trapped via a command parser;

predict graphics memory pages that may be potentially dirtied via execution of a trapped command or batch of trapped commands by the GPU; and include the content of the graphics memory pages that are predicted to be potentially dirtied as part of the VM checkpoint.

23. The system of claim 21, wherein execution of the instructions further enables the system to:

predict execution times of a command or batch of commands; and determine, based on the predicted execution times, which commands to submit to the GPU prior to performing a next checkpointing operation.

24. The system of claim 21, wherein execution of the instructions further enables the system to:

scan trapped commands submitted by a graphics driver for a given VM through a command parser; and emulate accesses to at least one of GPU Input/Output (I/O) registers and one or more GPU page tables using the virtual GPU associated with the given VM.

25. The system of claim 21, wherein execution of the instructions further enables the system to:

detect GPU accesses to a display buffer or command buffer; and track dirty graphics memory pages resulting from the GPU accesses to the display buffer and command buffer.

* * * * *